May 16, 1933. S. L. PEARCE 1,908,782
APPARATUS FOR THE TREATMENT OF FLUE GASES AND THE LIKE
Filed Feb. 6, 1930 6 Sheets-Sheet 5

Patented May 16, 1933

1,908,782

UNITED STATES PATENT OFFICE

STANDEN LEONARD PEARCE, OF LONDON, ENGLAND, ASSIGNOR OF ONE-HALF TO LONDON POWER COMPANY LIMITED, OF LONDON, ENGLAND

APPARATUS FOR THE TREATMENT OF FLUE GASES AND THE LIKE

Application filed February 6, 1930, Serial No. 426,405, and in Great Britain July 16, 1929.

This invention has for its object to devise simple and effective means for the treatment of flue gases, residual trade gases and other gases, fumes or vapours ordinarily discharged into the atmosphere, whereby any obnoxious or disagreeable products or substances contained therein may be abstracted from such gases before final discharge so as to render the same entirely or substantially innocuous or such as not to constitute a source of annoyance to residents and others or damage to buildings and vegetation in the vicinity.

The invention has the further advantage that any marketable or useful constituents or by-products that would otherwise be carried away with the gases or the like may be readily recovered.

According to my invention the gases or the like before discharge are first led through a chamber or conduit, preferably containing free iron or other catalytic agent or agents, and provided with atomizing devices or other means for thoroughly saturating the gases (which may also be scrubbed in said primary chamber) after which they are washed and scrubbed in other chambers or towers (or in another zone or zones of the same chamber), the direction of flow being preferably changed between successive operations so as to facilitate the separation from the gases of any impurities or substances abstracted by such operations.

The invention also consists in a treatment according to the preceding paragraph according to which the gases before discharge and after preliminary treatment are ozonized or mixed with ozonized air.

The invention further comprises the apparatus for carrying out the herein described methods and other details and arrangements hereinafter described or indicated.

The accompanying drawings illustrate two modes of carrying out the invention.

Figure 1:
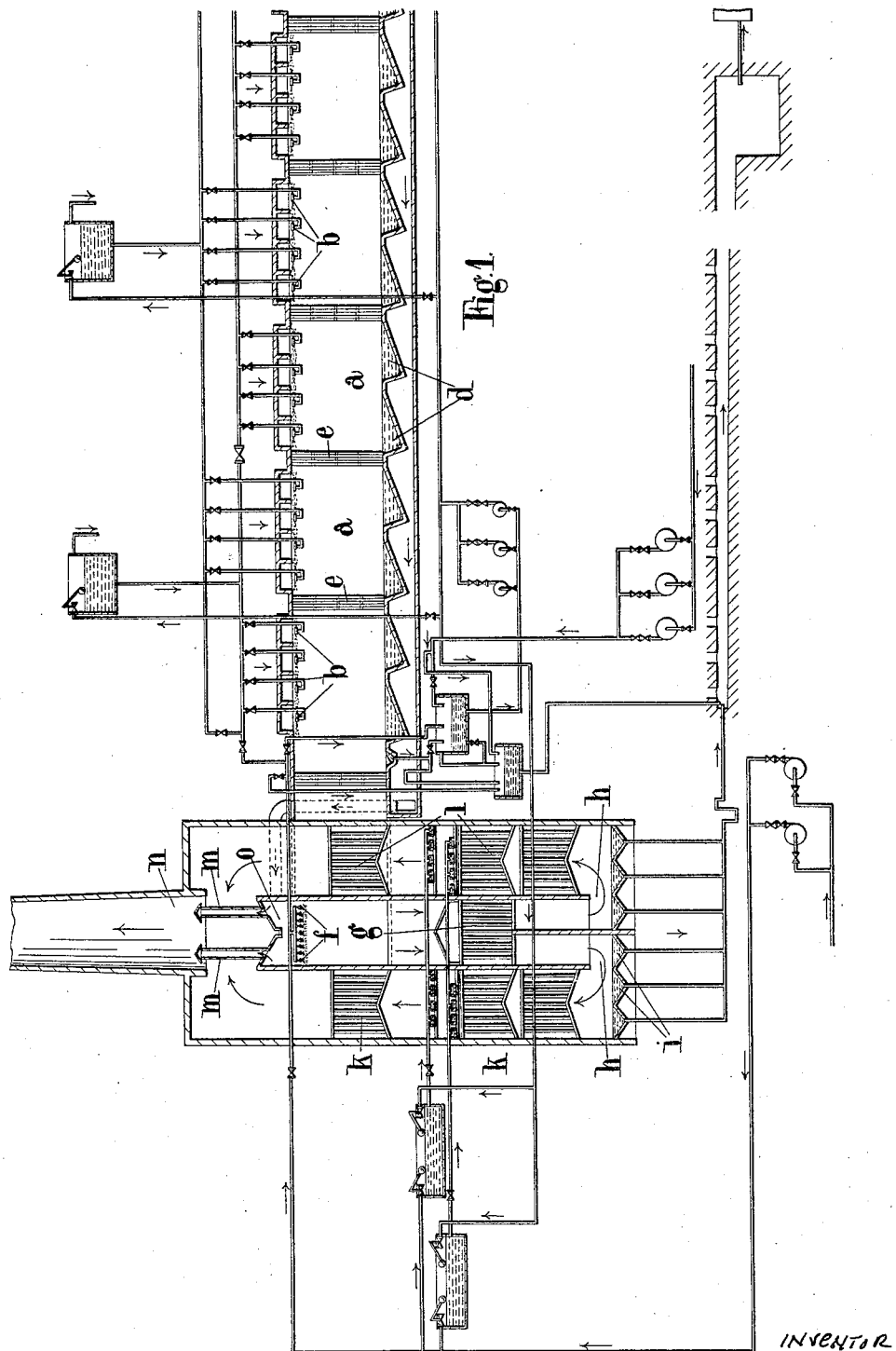
Figure 1 is a more or less diagrammatic sectional elevation of a plant constructed and arranged in accordance with the invention, but with the left hand portion comprising the uptake shown turned at 90° to its proper position.
Figure 2:
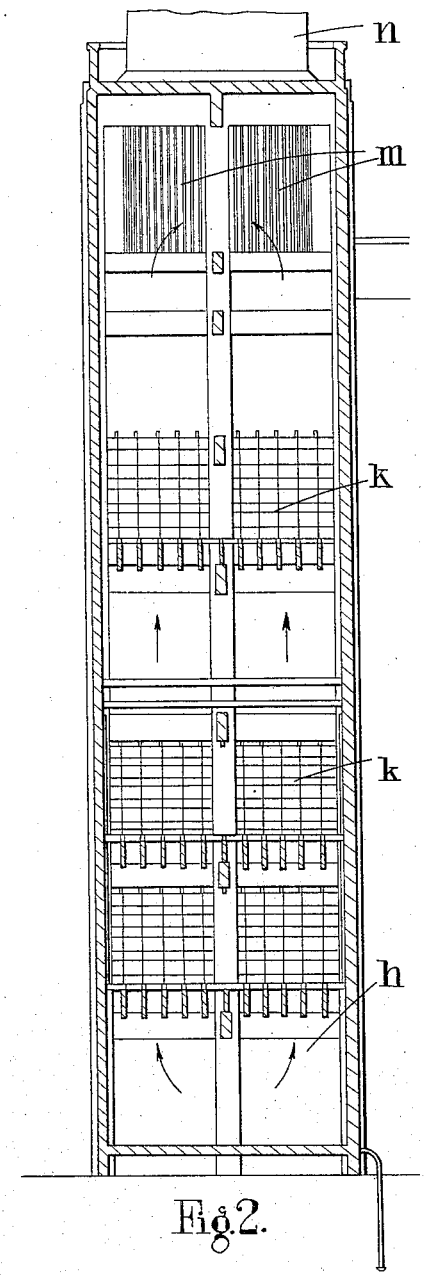
Figure 2 is a section on the line 2—2 of Figure 3.
Figure 3:
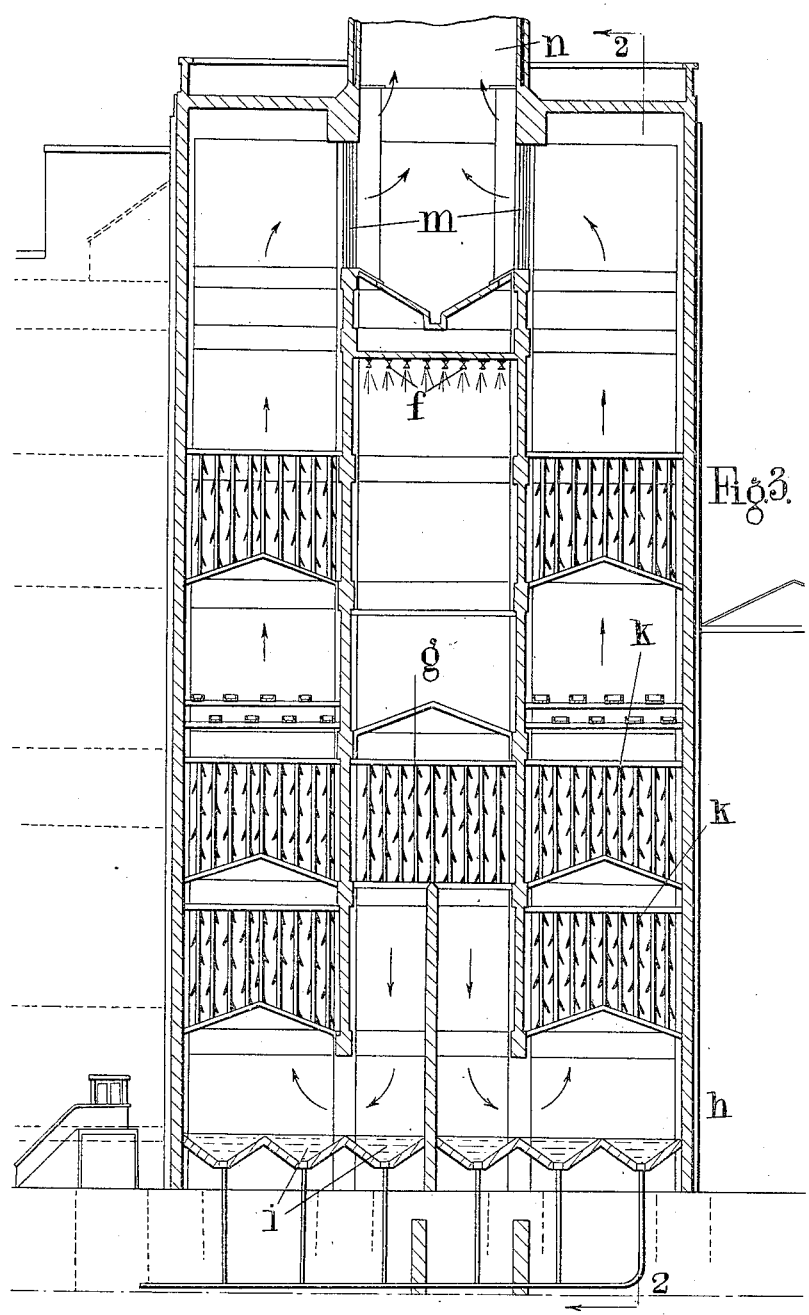
Figure 3 is a section on the line 3—3 of Figure 4.
Figure 4:
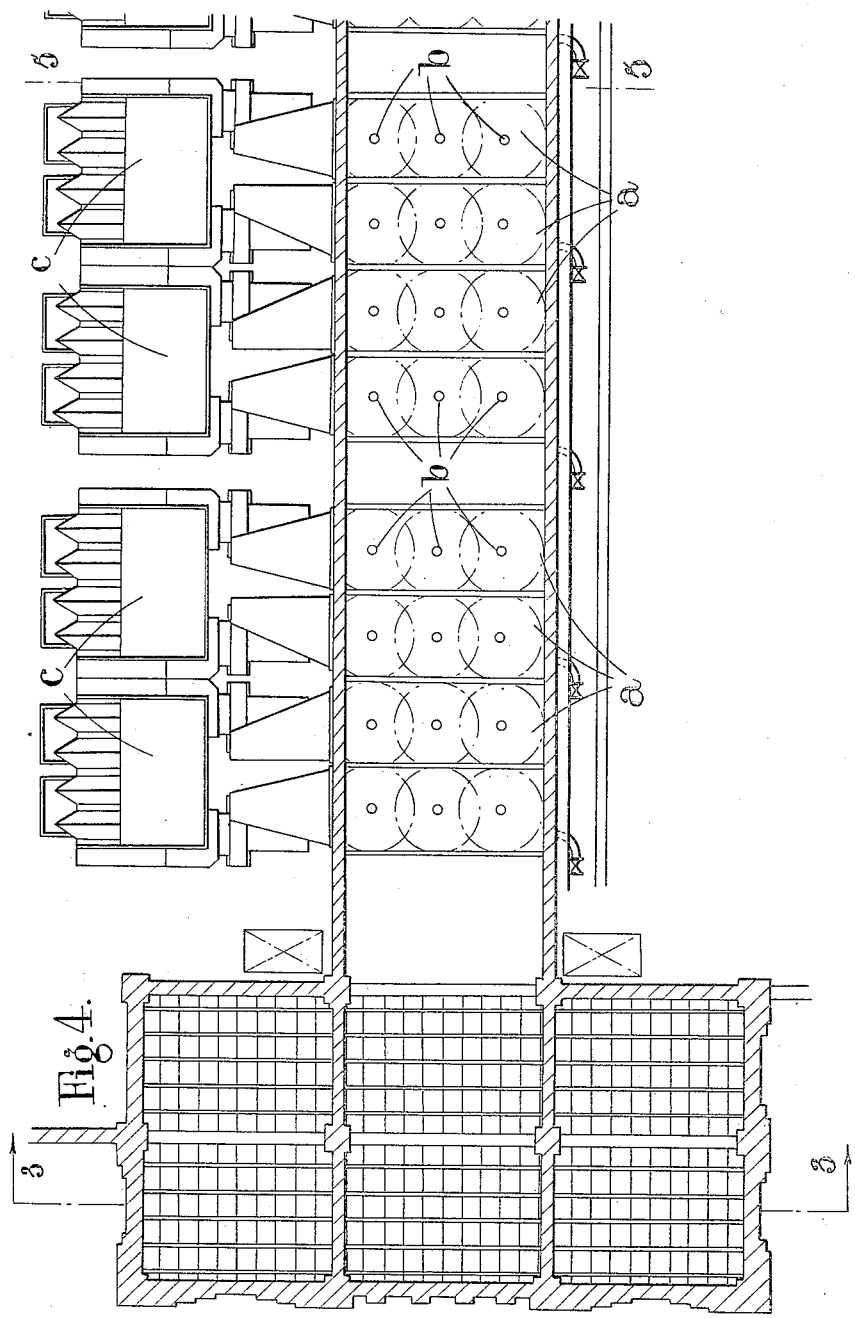
Figure 4 is a sectional plan of a part of Figure 1 on a somewhat larger scale but with the left hand portion shown in its proper position.
Figure 5:
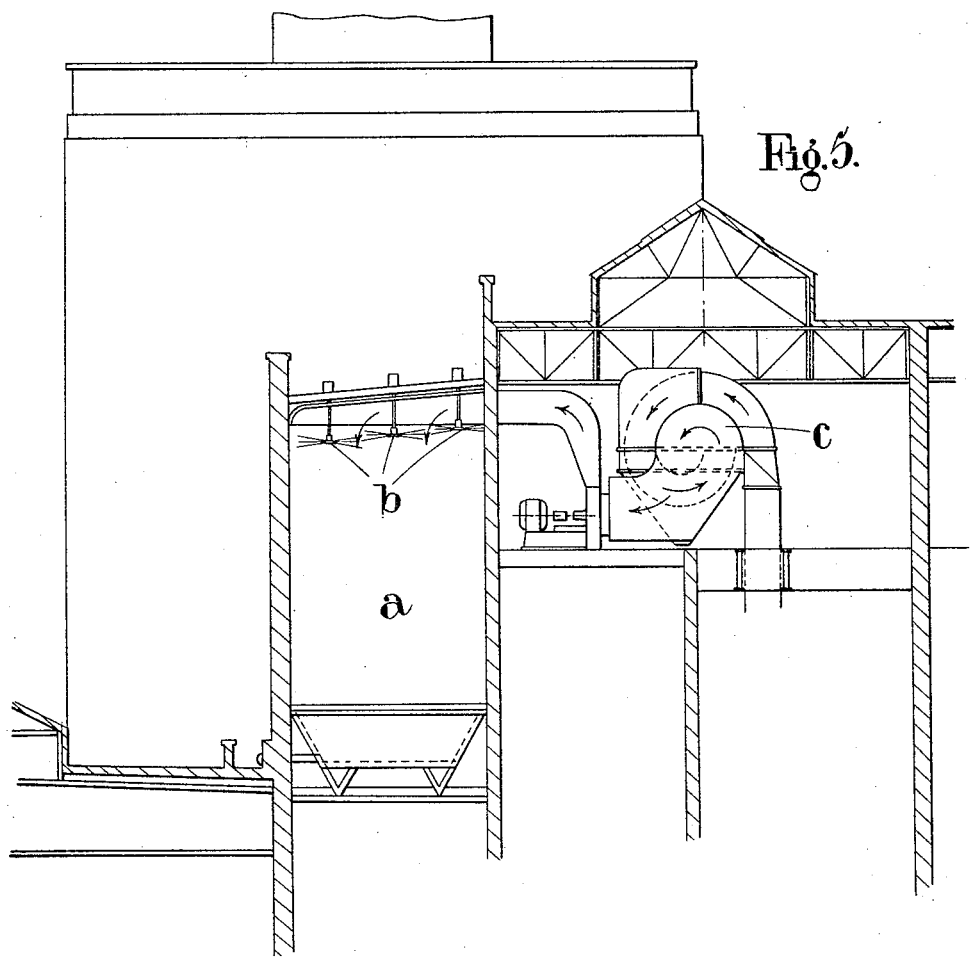
Figure 5 is a section on the line 5—5 of Figure 4.

In carrying my invention into effect in one convenient manner as, for example, in its application to the treatment of flue gases from a boiler installation which would ordinarily be discharged through the chimney or uptake into the atmosphere in the condition in which they leave the furnaces, and as illustrated in Figures 1 to 5 when applying the invention to a new installation, I arrange for the flue gases issuing from the main flue to pass through a primary chamber $a$ or conduit in which are located a number of fluid-atomizing units or sprays $b$ disposed at the top and/or sides of the chamber or otherwise conveniently located therein, the function of which is thoroughly to saturate the gases as they pass through such chamber or conduit. The sprays or the like may be associated with grit extractors $c$ of standard cyclone type and which may, for example, comprise fans or blowers by which the gases are introduced into the primary chamber and in which the grits or other foreign matter is extracted from the gases by centrifugal action.

Any liquid deposit in such chamber or conduit may be received by a plurality of hopper-like or other collecting devices $d$ or in a collecting channel or channels or in any other manner which will enable such deposit to be removed for treatment or disposal, and the primary chamber may be formed as or divided into a number of units separated from one another by scrubbers e of suitable form.

At the outlet end of the chamber or conduit I arrange for the gas to be submitted to a thorough douching by means of sprays f or curtains of fluid and at the same time the direction of flow of the gas is altered and the gases passed through a series of scrubbers g of wood, fire-clay, metal tubes, earthenware, porcelain, or other suitable packings disposed or packed in absorption towers or chambers.

The direction of flow is preferably again changed (for example it may be reversed as at h) so as to facilitate the throwing-down or separation of a portion of the entrained liquid (which may be collected in the trough i) and the gases are then passed through an additional bank or banks of scrubbers k l or the like wetted with an alkaline wash-water or other fluid for final treatment, it being understood, however, that before such final treatment the gases may be passed through any number of series of scrubbers and may have their direction of flow changed any desired number of times.

After treatment with alkaline wash-water or the like the gases are conducted through moisture eliminators m which may be constructed of wood, earthenware, metal, or other suitable material and may be perforated or arranged in baffle form or may otherwise be constructed or disposed so as to prevent the emission of free moisture to the atmosphere, the gases finally passing from such eliminator plates to the chimney proper n where provision is made for the admixture of hot air with the gases so as to reduce the saturated condition of the gases and to dilute the gases as finally discharged to atmosphere. For example, such air may be admitted to the gas stream from the chamber o.

In some cases I may ozonize part of the gases or I may introduce into the gases ozonized air either in addition to or in substitution for the introduction of ordinary air as above referred to, and while I prefer that the atomizing liquid in the initial stage should be at a temperature of about 175 to 180° F. while the liquid employed for douching the gases is at atmospheric temperature yet it will be understood that arrangements are preferably made in every stage of the process to vary the temperature of wash-water or other alkaline water used in the atomizers, sprays or scrubbers as may be found best suited to the character or constitution of the gases to be treated.

By the use of hot water and with the aid of catalysts as above referred to, I facilitate the conversion of sulphur dioxide, sulphurous acid and sulphites to sulphuric anhydride, sulphuric acid and sulphates respectively.

The liquid employed in the various stages of treatment may be re-circulated either wholly or in part with or without suitable filtering or other treatment (such as passing through tanks containing iron or other catalyst). The velocity of flow of the gases (whether caused by induced or forced draught) may be varied as may be desired, and the time of contact between the liquid and the gases adjusted to suit the particular application of the invention.

Any desired arrangement of pumps, pipe lines, tanks and other appurtenances may be used to facilitate the circulation and/or re-circulation of the liquid, air or other media employed.

By means of this invention flue gases or the like may be treated for the removal and elimination of grits, smoke, compounds of sulphur and other objectionable constituents therein, the nature of any reagents employed in the different stages of the treatment being in general determined by the character of the gases or the like to be treated.

Figure 6:
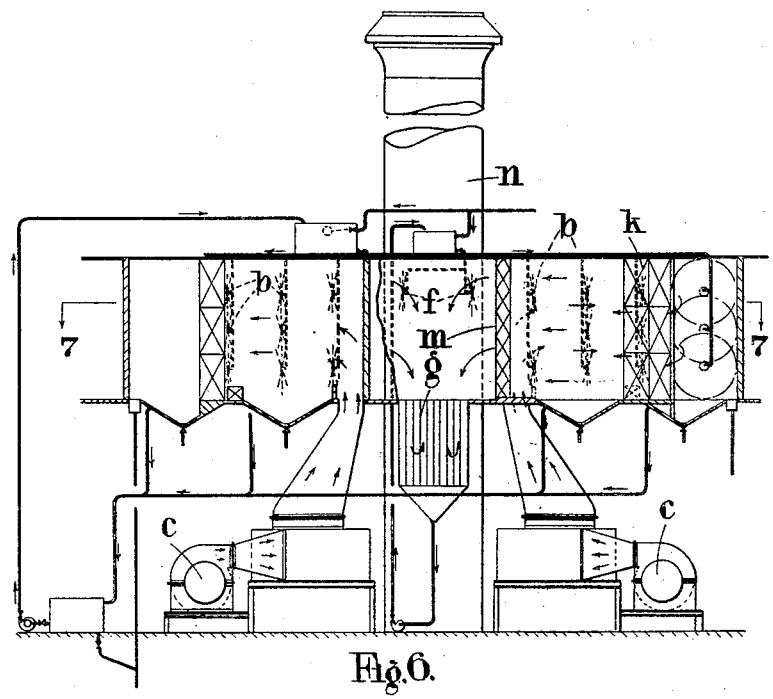
Figure 6 is a diagrammatic sectional elevation showing the invention applied to an existing installation.
Figure 7:
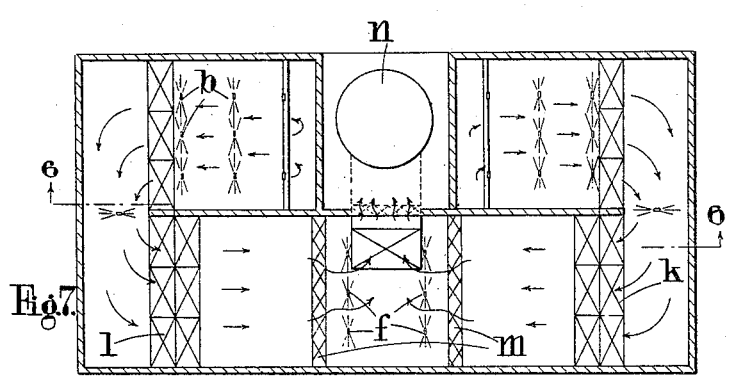
Figure 7 is a sectional plan of Figure 6.

Figures 6 and 7 show the application of the invention to an existing installation in which space is more restricted, and as similar parts in these figures to those in the foregoing have been indicated by similar reference letters, it is thought that no further description will be needed to make this modification clear.

The invention is not to be limited to the foregoing details which are given purely by way of illustration to indicate the nature of the invention as I may arrange for horizontal, vertical and/or other suitable direction of flow of the gases, and at such of the parts of the apparatus as involve a change in the direction of flow I may, if necessary or desirable, provide suitable collecting troughs or other devices with means for facilitating the removal therefrom of any substances, impurities, or materials deposited therein.

I claim:

1. Apparatus for removing obnoxious products from flue gases, comprising, a series of primary chambers into which the flue gases are admitted, scrubbers between the chambers and forming the walls separating the chambers, said scrubbers being permeable to the gases passing from one chamber to another, spray nozzles in said chambers for washing the gases, means at the bottom of each chamber for collecting the water from the nozzles carrying the washed out gas products, a second chamber adapted to receive in its upper portion the sprayed gases from the primary chambers, means for douching the gases located in the upper portion of the second chamber, a scrubber in the second chamber beneath the douching means, the sides of the second chamber extending downwardly beyond the scrubber, means at the bottom of the second chamber for collecting the water and foreign matter washed from the gases in said second chamber, the sides of said second chamber having openings near their bottom for changing the direction of motion of the gases, a third chamber for the reception of the gases at its lower end also having a scrubber therein through which the gases pass upwardly, and a flue above the third chamber to receive and emit the purified gases.

2. Apparatus according to claim 1, and means for admitting air to the gases as they enter the flue above the third chamber.

3. Apparatus according to claim 1, and a moisture eliminator at said flue and through which the purified gases are passed after the final washing operation.

4. Apparatus according to claim 1, and including means in association with the primary chamber for separating the grit.

In testimony whereof I have signed my name to this specification.

STANDEN LEONARD PEARCE.